United States Patent
Brenner et al.

(10) Patent No.: US 9,459,179 B2
(45) Date of Patent: Oct. 4, 2016

(54) METHOD AND DEVICE FOR MONITORING A DRIVE TRAIN OF A WIND POWER PLANT

(71) Applicant: Robert Bosch GmbH, Stuttgart (DE)

(72) Inventors: Daniel Brenner, Dresden (DE); Dirk Schollbach, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 14/355,416

(22) PCT Filed: Oct. 13, 2012

(86) PCT No.: PCT/EP2012/004293
§ 371 (c)(1),
(2) Date: Apr. 30, 2014

(87) PCT Pub. No.: WO2013/064209
PCT Pub. Date: May 10, 2013

(65) Prior Publication Data
US 2015/0052985 A1    Feb. 26, 2015

(30) Foreign Application Priority Data
Nov. 2, 2011 (DE) .......................... 10 2011 117 468

(51) Int. Cl.
*G01M 19/00* (2006.01)
*G01M 15/14* (2006.01)
(Continued)

(52) U.S. Cl.
CPC .............. *G01M 15/14* (2013.01); *F03D 15/00* (2016.05); *F03D 17/00* (2016.05); *G01H 1/003* (2013.01); *G01H 1/006* (2013.01); *G01M 7/00* (2013.01); *G01M 13/02* (2013.01); *G01P 15/00* (2013.01); *F05B 2260/80* (2013.01); *F05B 2270/807* (2013.01); *Y02E 10/722* (2013.01)

(58) Field of Classification Search
CPC ..................................... G01M 19/00

USPC .................................. 73/112.01, 112.03, 147
See application file for complete search history.

(56) References Cited

U.S. PATENT DOCUMENTS 9,004,862 B2 * 4/2015 Miranda ........................... 416/1
9,194,843 B2 * 11/2015 Newman
(Continued)

FOREIGN PATENT DOCUMENTS

| DE | 100 65 314 A1 | 7/2002 |
| EP | 2 108 830 A2 | 10/2009 |
| WO | 2006/012827 A1 | 2/2006 |

OTHER PUBLICATIONS

International Search Report corresponding to PCT Application No. PCT/EP2012/004293, mailed Sep. 25, 2013 (German and English language document) (5 pages).

*Primary Examiner* — Eric S McCall
(74) *Attorney, Agent, or Firm* — Maginot, Moore & Beck LLP

(57) ABSTRACT

A method for monitoring a state of a drive train of a wind power plant. The drive train including at least one component which is mechanically connected to a rotating element of the drive train and at least one acceleration sensor connected to the rotating element and located at a distance from a rotational axis of the drive train. The at least one acceleration sensor is configured to rotate about the rotational axis of the drive train at the distance. A signal of the at least one acceleration sensor is sensed in terms of its timing at least one rotational speed of the rotating element and is examined for interference frequencies which correspond to damage in the drive train.

18 Claims, 4 Drawing Sheets

(51) Int. Cl.
  *G01M 7/00* (2006.01)
  *G01H 1/00* (2006.01)
  *G01M 13/02* (2006.01)
  *G01P 15/00* (2006.01)

(56) References Cited

U.S. PATENT DOCUMENTS

| | | | |
|---|---|---|---|
| 2008/0206052 A1* | 8/2008 | Volkmer | 416/61 |
| 2009/0319199 A1* | 12/2009 | Volkmer | 702/41 |
| 2011/0018268 A1* | 1/2011 | Snel et al. | 290/44 |
| 2011/0135466 A1* | 6/2011 | Latorre et al. | 416/1 |
| 2011/0135475 A1 | 6/2011 | Ahmann | |
| 2011/0268571 A1* | 11/2011 | Menke | 416/61 |
| 2012/0068462 A1* | 3/2012 | Laurberg | 290/44 |
| 2012/0134813 A1* | 5/2012 | Nies et al. | 416/1 |
| 2013/0110414 A1* | 5/2013 | Caponetti et al. | 702/35 |
| 2013/0121825 A1* | 5/2013 | Miranda | 416/1 |
| 2013/0167624 A1* | 7/2013 | Shoda | 73/112.01 |
| 2013/0167625 A1* | 7/2013 | Becker | 73/112.01 |
| 2013/0170981 A1* | 7/2013 | Lang et al. | 416/1 |
| 2014/0140844 A1* | 5/2014 | Slot | 416/1 |
| 2014/0161610 A1* | 6/2014 | Hess et al. | 416/1 |
| 2015/0000404 A1* | 1/2015 | Brenner et al. | 73/579 |
| 2015/0078895 A1* | 3/2015 | Odgaard | 416/1 |

* cited by examiner

METHOD AND DEVICE FOR MONITORING A DRIVE TRAIN OF A WIND POWER PLANT

This application is a 35 U.S.C. §371 National Stage Application of PCT/EP2012/004293, filed on Oct. 13, 2012, which claims the benefit of priority to Serial No. DE 10 2011 117 468.4, filed on Nov. 2, 2011 in Germany, the disclosures of which are incorporated herein by reference in their entirety.

The present disclosure relates to a method for monitoring a condition of a drive train, in particular of a wind power plant, a computing unit for carrying out said method and a correspondingly configured monitoring device.

BACKGROUND

As far as possible interuption-free operation of wind power plants (WPP) is a central precondition for their economic viability. In particular, unplanned operational interruptions owing to damage to the drive train or the rotor blades entail considerable repair costs and frequently lead to insurance claims.

In order to avoid such disadvantages, so-called condition-oriented maintenance is provided for WPPs, which maintenance is carried out on the basis of vibration-based condition monitoring (CM) of rotor blades in corresponding condition monitoring systems (CMS). Such measures permit, for example, incipient damage in rotor blades to be detected early. CMS are frequently configured for remote diagnostics, wherein the condition messages are evaluated in certified diagnostic centers, frequently by specially trained personnel.

As a result of the use of CMS it is possible to detect faults early and avoid unplanned stoppages and reduce costs for supplying spare parts, maintenance and production failures. CMS increases overall availability and production stability.

In order to monitor the drive train of wind power plants, their components are frequently assigned individual sensors, for example solid-borne sound sensors or vibration sensors which are correspondingly evaluated in order to monitor the condition of the components.

However, sensor arrangements which are conventionally used for drive train monitoring frequently prove costly and unreliable. There is therefore a need for more cost-effective, reliable prediction and/or detection of drive train damage.

SUMMARY

Against this background, the disclosure proposes a method for monitoring a condition of a drive train of a wind power plant which has at least one acceleration sensor which is arranged on at least one rotating component of the wind power plant, a corresponding monitoring device and a corresponding computing unit having the features described herein.

"Acceleration sensor" is to be understood in the sense of the disclosure as also meaning the specified solid-borne sound sensors and vibration sensors.

DE 100 65 314 B4 and WO 2006/012827 A1 propose, for the purpose of monitoring the condition of rotor blades of a WPP, that solid-borne sound be measured by means of one or more sensors arranged on the rotor blade, that a frequency spectrum be determined from corresponding signals in an evaluation unit by means of suitable methods, that the frequency spectrum be compared with reference spectra which are stored in the evaluation unit and correspond to defined damage conditions and special conditions, and that the condition of the rotor blade be determined therefrom. The intention is that this will permit, inter alia, early detection and evaluation of local internal and external damage which occurs and of special conditions of the rotor blades, for example unusual load situations, which cause damage, in order to be able to influence the operation of the system, preferably in an automated fashion.

The present disclosure is based on the surprising realization that damage to a rotating drive train, in particular of a wind power plant, can be detected very well by using an acceleration sensor which is arranged at a relatively large distance from a rotational axis of the drive train on a component which rotates along with an element of the drive train. In the case of a wind power plant, the rotating element constitutes, for example, the main shaft of the drive train, and the component which is mechanically connected thereto is, for example, a rotor blade. The distance here may be, for example, at least 1, 2, 4, 6, 8 or 10 meters and/or at most 10, 20, 30, 40, 50 or 100 meters.

Monitoring can then occur, in particular, at at least one rotational speed of a rotor of the wind power plant by detecting the corresponding sensor signal over time and checking the signal for interference frequencies. The detected interference frequencies can be assigned to particular damage in the drive train of the wind power plant.

As is also explained in more detail below with respect to FIG. 1, within the scope of this disclosure the term "drive train" is to be understood as meaning, in particular, a rotor shaft having a bearing arrangement assigned thereto, a transmission which is, if appropriate, assigned thereto, and a corresponding generator. According to the disclosure it is proposed, for example, also that the sensors which are usually used to detect vibrations of a rotor blade in order to derive load states and, if appropriate, damage on the basis of the vibrations, should also be used to analyze vibrations and shocks from the drive train. This can permit, inter alia, defects, bearing damage and/or increased wear to be detected.

According to the disclosure it has been realized that the spectra which are usually determined during the monitoring of rotor blades also contain excitation elements and therefore corresponding frequencies which arise from the drive train of the system. It was possible to detect that the drive train frequencies which are detected in the rotor blade have significantly better resolution than the frequencies that are measured directly with corresponding sensors on the drive train.

However, the corresponding sensors do not necessarily have to be arranged exclusively on or in the rotor blades of a corresponding wind power plant. In certain application cases it may also prove advantageous to use different sensors or sensor arrangements, generally those which are provided on at least one rotating component of the wind power plant. The acceleration sensors which are to be used can comprise horizontal, tangential and/or radial acceleration sensors, in particular such sensors which are arranged at a radial distance, for example of 10 meters or more, on a rotating shaft. According to the principle, monitoring in the measuring direction tangentially with respect to the rotor is most suitable. However, any movements which have at least one tangential component can be recorded.

The measures according to the disclosure are therefore particularly suitable for eliminating the need for conventional drive train monitoring by means of sensors on or at components of the drive train, for example of a generator transmission, and as result permit simpler, more cost-effective and more reliable monitoring of a drive train which requires significantly fewer sensors. Accordingly, the maintenance of a WPP becomes more cost-effective, permitting simpler and more reliable operation. Sensors which are spaced apart from an axle permit significantly better spectral resolution.

A significant disadvantage which occurs with conventional methods for drive train monitoring is that with conventional systems in particular planetary gear damage and planetary bearing damage cannot be detected until severe damage has occurred. In contrast to this, the present disclosure also permits such damage to be determined simply and reliably and at an early stage.

Overall, the present disclosure therefore permits earlier detection of damage and requires only one measurement system. In particular, as mentioned, damage detection on planetary gear stages of a corresponding wind power plant is possible.

Further aspects of the measures proposed according to the disclosure will be summarized and explained once more below.

The present disclosure makes use of the fact that damage to machine elements which induce a rotational vibration can be detected very early and even when the damage is small in scope by means of acceleration sensors which are located or arranged on a corresponding shaft. The present disclosure makes it possible to extract, inter alia, gear tooth engagement frequencies and rotational frequencies of the transmission by means of the transmission kinematics, and from the rotor blade vibration data given a known rotational speed. The trend profile over time of the respective amplitudes can provide information about the condition of the respective transmission.

It is particularly advantageous to use capacitive acceleration sensors within the scope of the present disclosure. With such capacitive sensors it is possible to determine a lower limiting frequency of 0 Hz, as a result of which even slowly rotating components can be monitored safely and reliably. In order to monitor quickly rotating components better with such sensors it is appropriate to extend the frequency range upwards. Corresponding sensors therefore permit improved monitoring compared with customarily installed piezo acceleration sensors in which only one frequency range, for example between approximately 0.1 Hz and 500 Hz, can be evaluated.

A significant advantage of the present disclosure is that the acceleration sensors in rotor blades are generally arranged over 10 meters away from the rotational axis. The lever arm which is present as a result permits even small rotational vibrations to be detected. Accordingly, rotational irregularities, which are caused by transmission damage and/or bearing damage, can be measured and detected early.

In order to monitor a rotor blade and therefore also to perform the disclosure monitoring of a drive train, commercially available blade monitoring devices can advantageously be used, said devices having, for example, two-axle acceleration sensors in each rotor blade, said sensors being positioned at a distance of approximately a third of the blade length from the blade root. In the working position, a corresponding sensor measures the acceleration tangentially with respect to the rotation of the rotor and the acceleration in the direction parallel to the rotor axis (tangential acceleration and axial acceleration). As a result of the large distance between the acceleration sensors and the rotational axis, the vibration acting on the drive shaft is amplified by a lever effect, with the result that, as mentioned, even very small rotational vibrations of the main shaft of the drive train can be detected. The method which is proposed according to the disclosure therefore has a considerably better detection quality than conventional monitoring methods.

As a result of the changing number of teeth in tooth engagement and the associated change in the rigidity, gearwheel stages generate a rotational vibration which is superimposed on the shaft rotation. This rotational vibration corresponds to a tangential acceleration. In the case of spur gear stages with oblique toothing, an axial acceleration is superimposed on the tangential acceleration. Owing to the positively locking connection of the elements in the gearwheel transmissions, the rotational vibration is transmitted to all the shafts with the corresponding transmission ratio.

In addition to gearwheel damage, the measures proposed according to the disclosure advantageously also permit damage to other machine elements such as, for example, rolling bearings, to be detected. Fatigue damage to rolling bearings also generates rotational vibration as a result of the changed bearing surface and therefore the changed rigidity in the rolling process.

The evaluation of corresponding frequencies within the scope of the present disclosure advantageously occurs in the form of frequency spectra which are generated, for example, from acceleration data of corresponding sensors by means of Fourier transformation. The frequency spectra can also be generated differently, for example by means of cosine transformation, wavelet transformation or ARMA (Auto-Regressive Moving Average) spectral estimators.

A further advantage is obtained if the frequency spectra are related, as a function of the instantaneous rotational speed i.e. the rotational speed determined at the respective measuring time, of the rotor of the wind power plant and corresponding order spectra are generated. A negative effect of changes in rotational speed on the measurement is therefore reduced.

In order to identify the causes of vibration, kinematic data of the drive train are advantageously used. For example, the transmission ratios and rollover conditions and, resulting from this, the damage frequencies including their sidebands and harmonics can be calculated on the basis of numbers of teeth and rolling bearing geometry.

The previously explained advantages relate to the method according to the disclosure, the monitoring device according to the disclosure and the corresponding computing unit in the same way.

A computing unit according to the disclosure, for example a corresponding monitoring device, is configured, in particular in terms of programming technology, to carry out a method according to the disclosure.

The implementation of the disclosure in the form of software is also advantageous since this permits particularly low costs, in particular if an executing computing unit is still used for further tasks and is therefore present in any case. Suitable data carriers for making available the computer program are, in particular, diskettes, hard disks, flash memories, EEPROMs, CD-ROMs, DVDs etc. A download of a program via computing networks (Internet, Intranet etc.) is also possible.

Further advantages and refinements of the disclosure can be found in the description and the accompanying drawing.

Of course, the features which are mentioned above and the features which are still to be explained below can be used not only in the respectively specified combination but in other combinations or alone without departing from the scope of the present disclosure.

BRIEF DESCRIPTION OF THE DRAWINGS

The disclosure is illustrated schematically on the basis of an exemplary embodiment in the drawing and will be described in detail below with reference to the drawing, in which.

DETAILED DESCRIPTION

Figure 1:
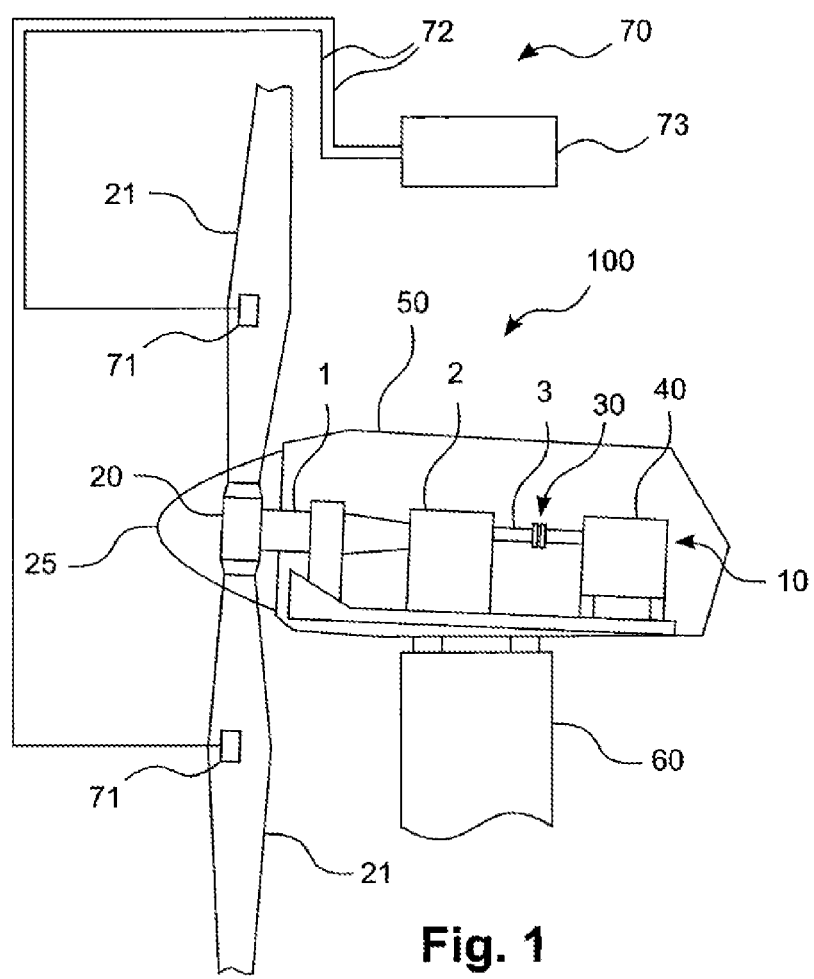
FIG. 1 shows a wind power plant which can be monitored by means of a method corresponding to an embodiment of the disclosure.

FIG. 1 illustrates a longitudinal sectional view of part of a wind power plant, which wind power plant can be monitored by means of a method according to a particularly preferred embodiment of the disclosure. The wind power plant is denoted in its totality by 100, and its drive train by 10.

The drive train 10 which is shown is composed essentially of a main shaft 1 on which a rotor 20 is mounted, a transmission 2 and a generator shaft 3. The transmission 2 can be, for example, a three-stage transmission which is customarily used in wind power plants. The disclosure can also be employed in gearless wind power plants.

The main shaft 1 is connected in a frictionally locking fashion to the rotor 20, for example to a vane rotor. The generator shaft 3 can be connected to a generator 40 via a clutch 30. The main shaft 1, the transmission 2, the generator shaft 3 and the generator 40 are supported with corresponding means, enclosed in a housing 50 ("gondola") and mounted on a tower 60. Two partially illustrated rotor blades 21 are mounted on the rotor 20. Rotors 20 which are conventionally used in wind power plants, have, for example, three rotor blades 21.

The rotor blades 21 of the rotor 20 have acceleration sensors 71 which are arranged, for example, at a distance of a third of their length from a rotor hub or rotor axis 25. The acceleration sensors 71 are connected as part of an evaluation system 70 to lines (also for example radio links) to an evaluation device 73 which evaluates signals of the acceleration sensors 71 and for this purpose can have a computing unit (not illustrated). Of course, the evaluation system 70 is typically arranged in the housing 50.

Figure 2:
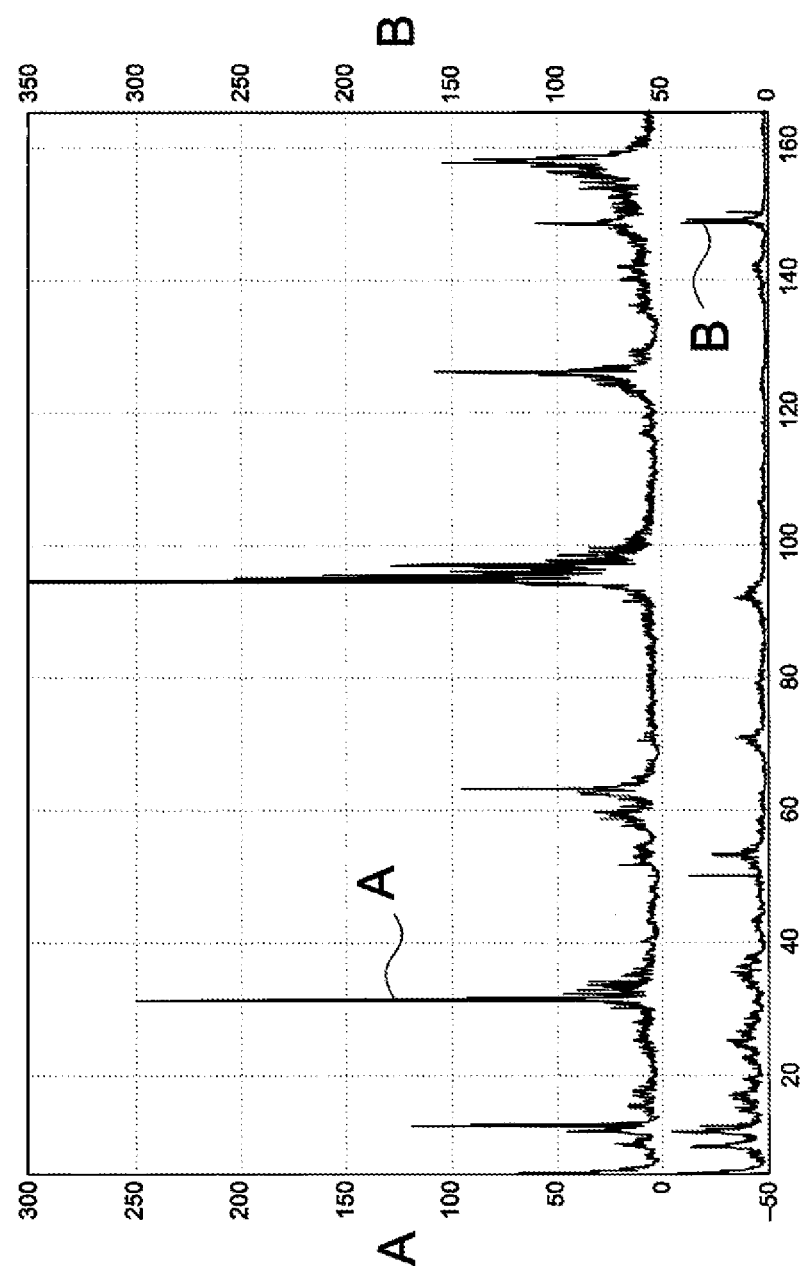
FIG. 2 shows a frequency spectrum of an acceleration sensor according to a particularly preferred embodiment of the disclosure at a first rotational speed.

FIG. 2 illustrates spectra such as can be obtained by evaluating acceleration sensor signals of acceleration sensors, for example of the acceleration sensors 71 in FIG. 1. The corresponding acceleration signals have been detected over time and converted, for example by Fourier transformation, into a frequency spectrum. The frequency spectra are specified in a frequency in Hz on the x axis and an amplitude on the left-hand y axis (A) and the right-hand y axis (B). The frequency spectra in FIG. 2 have been recorded at a rotational speed of a wind power plant of 0.18 Hz.

In the respective wind power plant a main transmission 2 has been replaced. A spectrum which was recorded before the replacement of the main transmission 2, that is to say before a corresponding repair, is denoted by A (amplitude plotted on the left-hand y axis). Spectrum B (amplitude plotted on the right-hand y axis) corresponds to a condition after a repair. The main transmission proves partially defective in the present case. In the spectrum A, in contrast to spectrum B which corresponds to the repaired condition, a fundamental frequency is clearly visible at 13.3 Hz and a second harmonic at 94 Hz, and a first, third and fourth harmonic are apparent in a less pronounced form. As can be seen, owing to the presence of the clearly pronounced explained frequencies in spectrum A, it is possible to conclude that corresponding damage is present in a drive train.

In FIG. 2, in a way analogous to FIG. 1, a corresponding frequency spectrum is illustrated before and after a repair, and is also denoted by 20. The spectrum before the repair is also denoted by A here, and after the repair by B. The spectra have been recorded at a rotational speed of 0.238 Hz. Before the repair, the fundamental frequency was at 42.1 Hz and the second harmonic at 126.3 Hz. These frequencies are strongly excited. The first and third harmonics of an outer ring rollover frequency are also visible but less strongly excited. A corresponding generator-side bearing which is used for the slowly rotating transmission shaft has in the corresponding wind power plant a rollover frequency for damage on the outer ring of 31.4 Hz at a rotor rotational speed of 0.1779 Hz (FIG. 2). At a rotational frequency of 0.238 Hz (FIG. 3) the outer ring rollover frequency is 42.1 Hz. This is clearly apparent owing to the illustrated frequency evaluation.

Intact rolling bearings do not generate any shock impulses during operation and are therefore not visible in the spectrum. The detection of the damage rollover frequencies clearly indicates damage to the corresponding machine element in the explained spectrum. These damage frequencies have been detected at different rotational speeds—as is apparent from FIGS. 2 and 3—and at different frequency values, as a result of which superimposition with structural frequencies is ruled out. Structural frequencies, such as for example, natural frequencies of the rotor blades, do not change substantially when the rotational speed changes.

Kinematic frequencies which can be used to determine the type of damage to rolling bearings can be derived from the rolling bearing geometry. From the pitch circle diameter, the rolling body diameter, the operating pressure angle, the rotational frequency and the number of rolling bodies it is possible to calculate, for example, the cage rotational frequency in the case of a fixed outer ring, the cage rotational frequency in the case of a fixed inner ring, the rollover frequency of an irregularity on the outer ring, the rollover frequency of an irregularity on the inner ring, the rolling body rotational frequency and/or the rollover frequency of a rolling body irregularity on both rolling tracks. Slip of the rolling body set, which can assume considerable values depending on the design and use of the bearing as well as load conditions, brings about a deviation between the frequency which can be determined from the kinematics and the actually measured frequency, which can be compensated by defining a tolerance limit.

Figure 3:
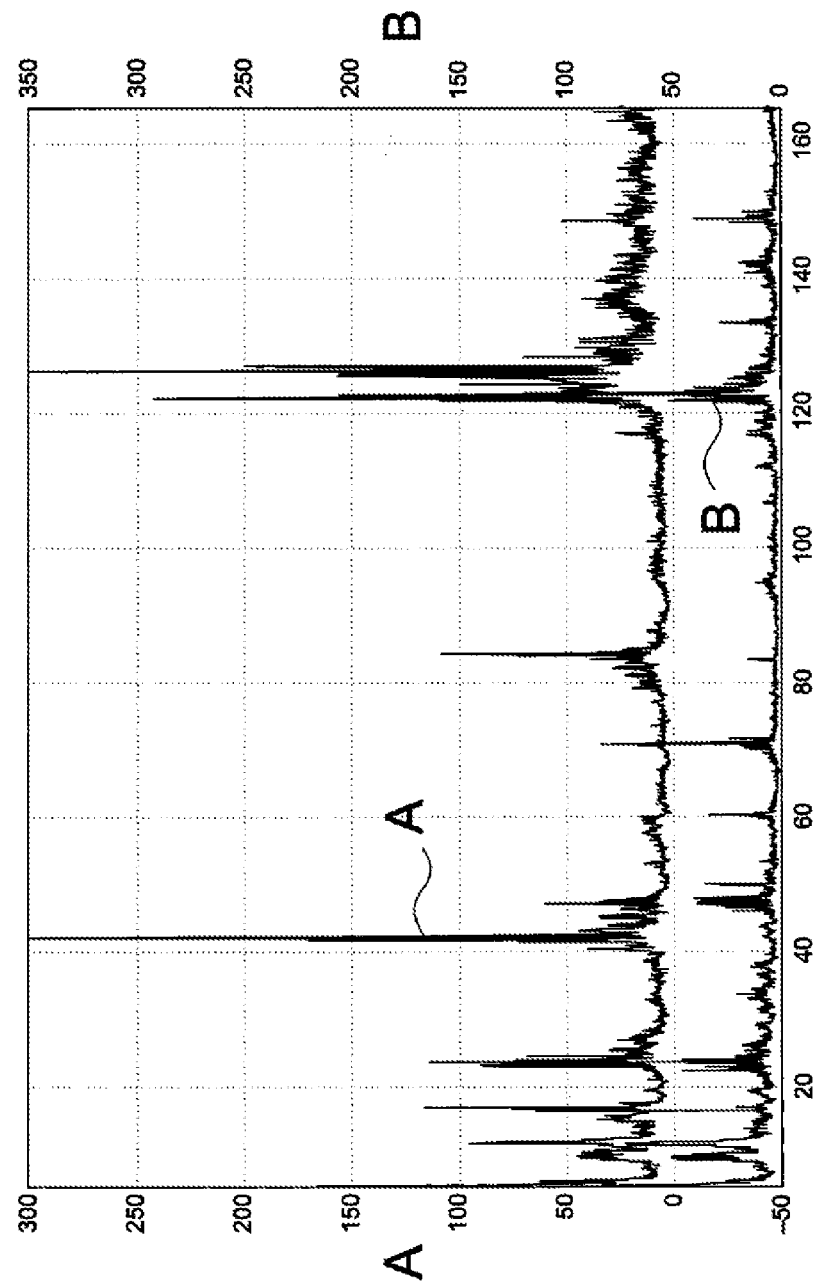
FIG. 3 shows a frequency spectrum of an acceleration sensor according to a particularly preferred embodiment of the disclosure at a second rotational speed.

FIGS. 2 and 3 illustrate an evaluation on the basis of the frequency. During a measurement cycle of, for example, 80 seconds, in the case of wind power plants with a variable rotational speed, variance occurs in the rotational speed which leads to propagation of corresponding frequency peaks. It is therefore proposed to carry out corresponding analysis on the basis of the order and to divide the measured frequency by the respectively present rotational speed. For this purpose, knowledge of the rotational speed at every point in time of the measurement is necessary, for which purpose a high resolution rotational speed measurement can be used. It was possible to determine that for this purpose a measurement with one pulse per revolution on the high-speed shaft of the generator is sufficient.

Figure 4:
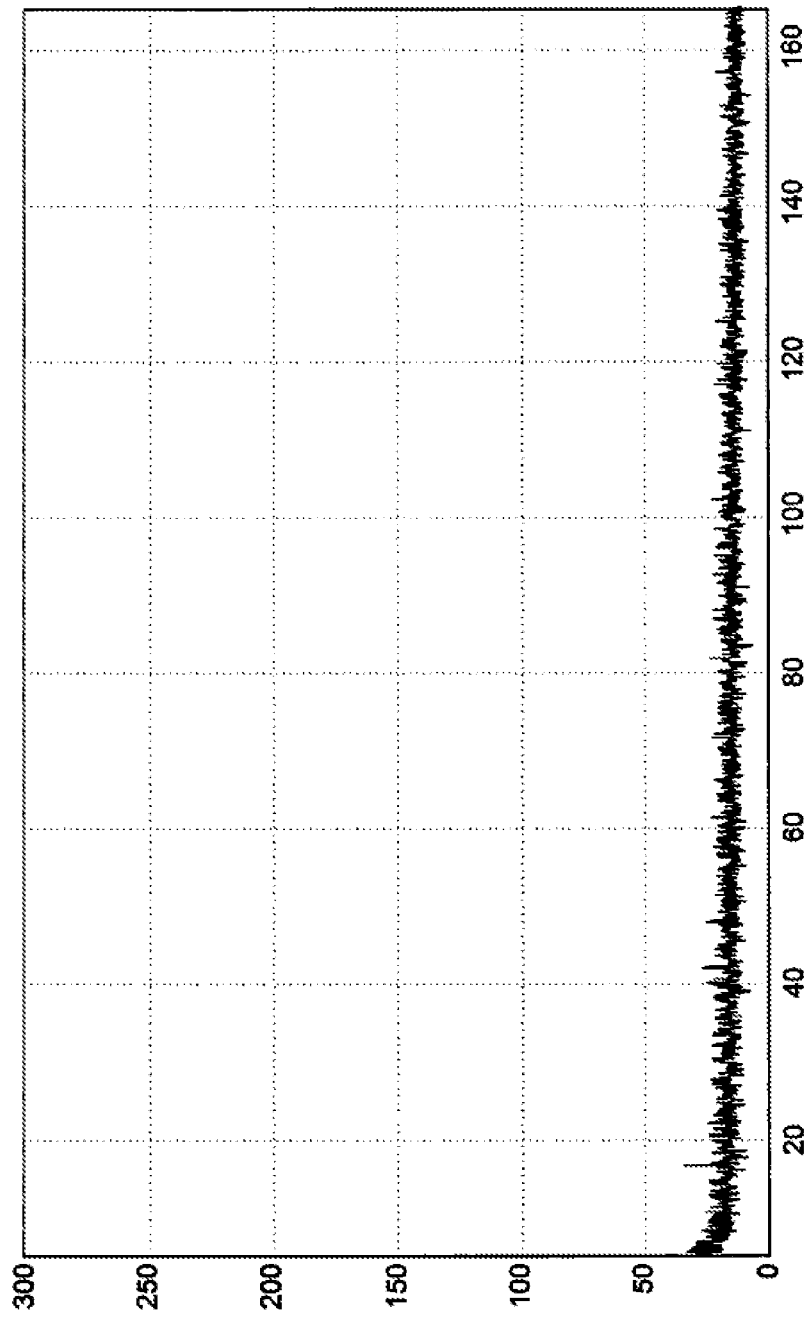
FIG. 4 shows a signal of a hub sensor in the form of a frequency spectrum according to the prior art.

FIG. 4 shows a signal of a hub sensor in the axial direction of a shaft according to the prior art. As can be seen, a peak is not detected in any of the frequencies excited by the transmission. Neither the tooth engagement frequency nor a damage frequency of the defective rolling bearing can therefore be detected according to the prior art. In contrast, the disclosure permits safe and reliable measurement of such damage.

The invention claimed is:

1. A method for monitoring a condition of a drive train of a wind power plant, the drive train including at least one component which is mechanically connected to a rotating element of the drive train, the method comprising:
    positioning at least one acceleration sensor on the at least one component at a distance from a rotational axis of the drive train;
    rotating said at least one acceleration sensor at the distance about the rotational axis by rotating the rotating element of the drive train;
    detecting an acceleration signal of the at least one acceleration sensor over time at at least one rotational speed of the rotating element; and
    checking for interference frequencies in the acceleration signal that correspond to damage to a component of the drive train, wherein the checking for interference frequencies at least comprises checking the acceleration signal for at least one of (i) a fundamental rotational frequency of the at least one component of the drive train and (ii) harmonics of the rotational frequency of the at least one component of the drive train.

2. The method as claimed in claim 1, wherein the distance is at least 1 meter and at most 100 meters.

3. The method as claimed in claim 1, the checking for interference frequencies comprising:
    checking the acceleration signal of the at least one acceleration sensor for interference frequencies that change in frequency as a rotational speed of the rotating element changes.

4. The method as claimed in claim 1, the checking for interference frequencies comprising:
    comparing the acceleration signal, which is detected over time, of the at least one acceleration sensor with a reference signal which corresponds to a condition in which there is no damage in the drive train.

5. The method as claimed in claim 1, further comprising:
    evaluating at least one rotational speed signal of a rotational speed sensor of the rotating element.

6. The method of claim 1, wherein a computing unit is configured to carry out the method.

7. The method as claimed in claim 1, the checking for interference frequencies comprising:
    converting the acceleration signal, which is detected over time, of the at least one acceleration sensor into a frequency spectrum; and
    evaluating features in the frequency spectrum to check for the interference frequencies.

8. The method as claimed in claim 7, the checking for interference frequencies comprising:
    converting the frequency spectrum into an order spectrum on the basis of at least one rotational speed of the rotating element.

9. A monitoring device for monitoring a condition of a drive train of a wind power plant, the drive train including a rotating element and at least one component that is mechanically connected to the rotating element, the monitoring device comprising:
    an acceleration sensor located on the at least one component at a distance from a rotational axis of the rotating element; and
    a computing unit configured to perform a method of monitoring the condition of the drive train including:
        positioning at least one acceleration sensor on the at least one component at a distance from a rotational axis of the drive train,
        rotating said at least one acceleration sensor at the distance about the rotational axis by rotating the rotating element of the drive train,
        detecting an acceleration signal of the at least one acceleration sensor over time at at least one rotational speed of the rotating element, and
        checking for interference frequencies in the acceleration signal that correspond to damage to a component of the drive train, wherein the checking for interference frequencies comprises at least one of:
            checking the acceleration signal for at least one of (i) a fundamental rotational frequency of the at least one component of the drive train and (ii) harmonics of the rotational frequency of the at least one component of the drive train; and
            checking the acceleration signal for interference frequencies which correspond to at least one of gearwheel damage, planetary gear damage, and bearing damage.

10. A method for monitoring a condition of a drive train of a wind power plant, the drive train including at least one component which is mechanically connected to a rotating element of the drive train, the method comprising:
    positioning at least one acceleration sensor on the at least one component at a distance from a rotational axis of the drive train;
    rotating said at least one acceleration sensor at the distance about the rotational axis by rotating the rotating element of the drive train;
    detecting an acceleration signal of the at least one acceleration sensor over time at at least one rotational speed of the rotating element; and
    checking for interference frequencies in the acceleration signal that correspond to damage to a component of the drive train, wherein the checking for interference frequencies at least comprises checking the acceleration signal for interference frequencies which correspond to at least one of gearwheel damage, planetary gear damage, and bearing damage.

11. The method as claimed in claim 10, wherein the distance is at least 1 meter and at most 100 meters.

12. The method as claimed in claim 10, the checking for interference frequencies comprising:
    checking the acceleration signal of the at least one acceleration sensor for interference frequencies that change in frequency as a rotational speed of the rotating element changes.

13. The method as claimed in claim 10, the checking for interference frequencies comprising:
    comparing the acceleration signal, which is detected over time, of the at least one acceleration sensor with a reference signal which corresponds to a condition in which there is no damage in the drive train.

14. The method as claimed in claim 10, the checking for interference frequencies further comprising:

checking the acceleration signal, which is detected over time, for at least one of:
- a first cage rotational frequency in a case of a fixed outer ring;
- a second cage rotational frequency in a case of a fixed inner ring;
- a first rollover frequency of an irregularity on the outer ring;
- a second rollover frequency of an irregularity on the inner ring;
- a rolling body rotational frequency; and
- a third rollover frequency of a rolling body irregularity on both rolling tracks.

15. The method as claimed in claim 10, further comprising:
evaluating at least one rotational speed signal of a rotational speed sensor of the rotating element.

16. The method of claim 10, wherein a computing unit is configured to carry out the method.

17. The method as claimed in claim 10, the checking for interference frequencies comprising:
converting the acceleration signal, which is detected over time, of the at least one acceleration sensor into a frequency spectrum; and
evaluating features in the frequency spectrum to check for the interference frequencies.

18. The method as claimed in claim 17, the checking for interference frequencies comprising:
converting the frequency spectrum into an order spectrum on the basis of at least one rotational speed of the rotating element.

* * * * *